(12) United States Patent
Matsui (10) Patent No.: US 9,277,118 B2
(45) Date of Patent: Mar. 1, 2016

(54) IMAGE PICKUP APPARATUS, METHOD FOR CONTROLLING THE SAME, AND PROGRAM FOR OBTAINING POSITION INFORMATION AND DIRECTION INFORMATION

(71) Applicant: CANON KABUSHIKI KAISHA, Tokyo (JP)

(72) Inventor: Takashi Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/707,402

(22) Filed: Dec. 6, 2012

(65) Prior Publication Data

US 2013/0147984 A1 Jun. 13, 2013

(30) Foreign Application Priority Data

Dec. 8, 2011 (WO) ................. PCT/JP2011/078426

(51) Int. Cl.
*H04N 5/232* (2006.01)
*H04N 1/00* (2006.01)
*H04N 1/21* (2006.01)
*H04N 101/00* (2006.01)

(52) U.S. Cl.
CPC ....... *H04N 5/23229* (2013.01); *H04N 1/00323* (2013.01); *H04N 1/215* (2013.01); *H04N 5/232* (2013.01); *H04N 2101/00* (2013.01); *H04N 2201/0084* (2013.01); *H04N 2201/3225* (2013.01); *H04N 2201/3253* (2013.01)

(58) Field of Classification Search
CPC . H04N 5/2322; H04N 1/00323; H04N 1/215; H04N 2201/3253; H04N 2201/3225

USPC .............. 348/36, 231.2, 231.3, 231.5, 231.6
See application file for complete search history.

(56) References Cited

U.S. PATENT DOCUMENTS

| | | | | |
|---|---|---|---|---|
| 6,710,808 | B1* | 3/2004 | Yamagishi | 348/362 |
| 6,995,792 | B1* | 2/2006 | Ogura | 348/231.99 |
| 7,436,434 | B2* | 10/2008 | Shibutani | 348/207.99 |
| 7,535,415 | B2* | 5/2009 | Yoshioka et al. | 342/357.74 |
| 7,667,742 | B2* | 2/2010 | Liao et al. | 348/231.3 |

(Continued)

FOREIGN PATENT DOCUMENTS

| | | | |
|---|---|---|---|
| JP | 09135416 A | * | 5/1997 |
| JP | 09247512 A | * | 9/1997 |

(Continued)

OTHER PUBLICATIONS

Translation of JP 2008-042256 A; Feb. 21, 2008.*

*Primary Examiner* — John Villecco
(74) *Attorney, Agent, or Firm* — Canon USA, Inc. IP Division (57) ABSTRACT

An image pickup apparatus includes continuous shooting means, position acquisition means, and direction acquisition means, wherein the continuous shooting means performs multiple shooting operations and obtains multiple images, the position acquisition means acquires position information, the direction acquisition means acquires direction information, and in the multiple shooting operations performed by the continuous shooting means, the position acquisition means does not acquire position information for each of the shooting operations performed by the continuous shooting means, and the direction acquisition means acquires direction information for each of the shooting operations performed by the continuous shooting means.

40 Claims, 6 Drawing Sheets

(56) References Cited

U.S. PATENT DOCUMENTS

| | | | |
|---|---|---|---|
| 2003/0193575 A1* | 10/2003 | Yoshioka | 348/207.99 |
| 2003/0194203 A1* | 10/2003 | Yoshioka et al. | 386/46 |
| 2007/0263981 A1* | 11/2007 | Ueno et al. | 386/83 |
| 2008/0117309 A1* | 5/2008 | Jeon | 348/231.2 |
| 2008/0125996 A1* | 5/2008 | Fitzhugh | 702/89 |
| 2008/0317456 A1* | 12/2008 | Lee et al. | 396/321 |
| 2009/0135274 A1* | 5/2009 | Kim et al. | 348/231.5 |
| 2011/0264715 A1* | 10/2011 | Singer et al. | 707/825 |
| 2011/0316970 A1* | 12/2011 | Cheong | 348/36 |
| 2012/0051448 A1* | 3/2012 | Yasuda | 375/259 |
| 2012/0098982 A1* | 4/2012 | Watanabe | 348/208.4 |
| 2012/0249832 A1* | 10/2012 | Okamoto et al. | 348/231.7 |
| 2012/0287267 A1* | 11/2012 | Fujimoto et al. | 348/135 |
| 2013/0076958 A1* | 3/2013 | Shirakawa | 348/333.01 |
| 2013/0194452 A1* | 8/2013 | Higaki | 348/231.5 |

FOREIGN PATENT DOCUMENTS

| | | | |
|---|---|---|---|
| JP | 11-282076 A | | 10/1999 |
| JP | 2001-128049 A | | 5/2001 |
| JP | 2001166366 A | * | 6/2001 |
| JP | 2002-094870 A | | 3/2002 |
| JP | 2008-042256 A | | 2/2008 |
| JP | 2008199319 A | * | 8/2008 |
| JP | 2010-072200 A | | 4/2010 |
| JP | 2010-213221 A | | 9/2010 |
| JP | 2011-114401 A | | 6/2011 |
| JP | 2011-139352 A | | 7/2011 |
| JP | 2011-193169 A | | 9/2011 |
| JP | 2013121137 A | * | 6/2013 |

* cited by examiner

IMAGE PICKUP APPARATUS, METHOD FOR CONTROLLING THE SAME, AND PROGRAM FOR OBTAINING POSITION INFORMATION AND DIRECTION INFORMATION

TECHNICAL FIELD

The present invention relates to an image pickup apparatus which can obtain position information and direction information.

BACKGROUND ART

Recently, using digital cameras provided with an accessory, such as a GPS (Global Positioning System) receiver or an electronic compass, for example, position information indicating a shooting position and direction information indicating a shooting direction are added to picked-up images. These kinds of information can be obtained by communicating with the accessory during shooting of an image. However, for example, in the case where multiple images are picked up in a short time period as in a continuous shooting operation, the load on a controller is heavy compared with the case where one image is picked up as in a single shooting operation. Therefore, it is not desirable to perform a process which increases the load, such as communication with an accessory, during a continuous shooting operation.

For example, in PTL 1, the load during a continuous shooting operation is reduced by stopping measurement of a position using the GPS during the continuous shooting operation.

CITATION LIST

Patent Literature

PTL 1 Japanese Patent Laid-Open No. 11-282076

However, in the method described above, no consideration is given to information in which a relatively large change may occur even in a short time period during a continuous shooting operation. For example, direction information is likely to change compared with position information. Accordingly, it is desirable to obtain direction information for each of the frames even in a continuous shooting operation.

It is an object of the present invention to adequately control acquisition of information that is to be added to images obtained in a continuous shooting operation while the load on a controller is reduced in the continuous shooting operation.

SUMMARY OF INVENTION

An image pickup apparatus of the present invention includes continuous shooting means, position acquisition means, and direction acquisition means. The continuous shooting means performs multiple shooting operations and obtains multiple images. The position acquisition means acquires position information. The direction acquisition means acquires direction information. In the multiple shooting operations performed by the continuous shooting means, the position acquisition means does not acquire position information for each of the shooting operations performed by the continuous shooting means, and the direction acquisition means acquires direction information for each of the shooting operations performed by the continuous shooting means.

Further features of the present invention will become apparent from the following description of exemplary embodiments with reference to the attached drawings.

DESCRIPTION OF EMBODIMENTS

Embodiments for embodying the present invention will be described in detail below by using the accompanying drawings.

The embodiments described below are examples as means for achieving the present invention. Modifications or changes may be made as appropriate in accordance with the configuration or various conditions of an apparatus to which the present invention is applied. The embodiments may be combined with one another as appropriate.

First Embodiment

Figure 1:
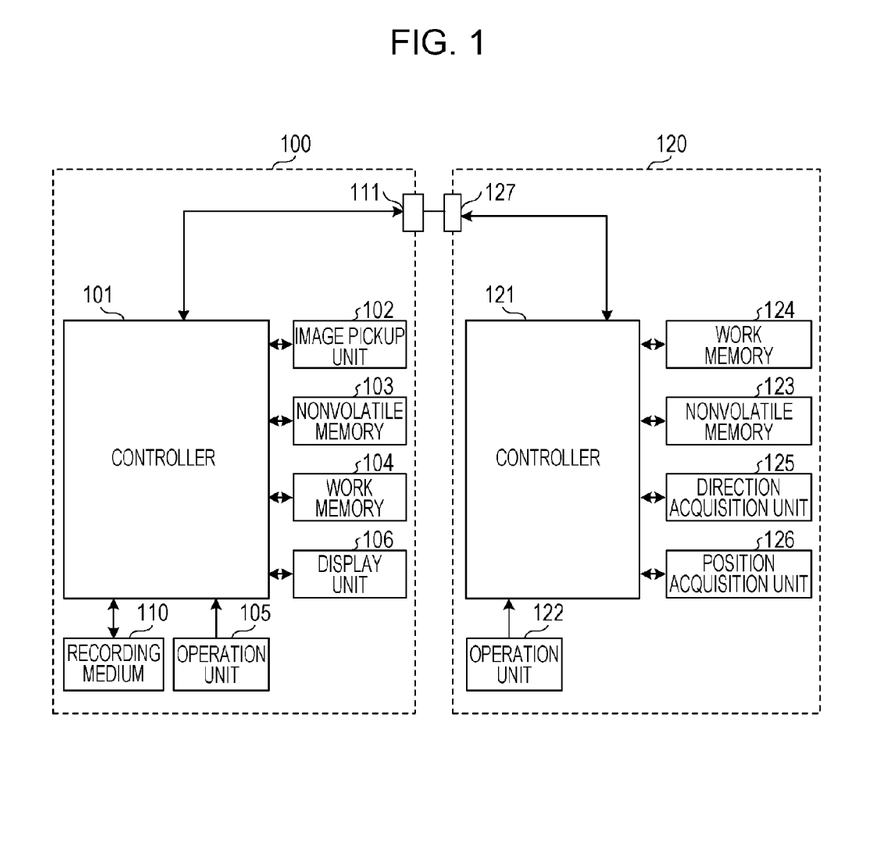
FIG. 1 is a block diagram illustrating the entire image pickup system according to a first embodiment.

FIG. 1 illustrates the configuration of an image pickup system according to the present embodiment. The image pickup system according to the present embodiment includes a digital camera 100 as an exemplary image pickup apparatus and a GPS accessory 120 as an exemplary external apparatus. Herein, description is made taking a digital camera as an example of an image pickup apparatus. However, an image pickup apparatus is not limited to this. For example, an image pickup apparatus may be, for example, a cellular phone with a camera or a tablet device with a camera.

First, the digital camera 100 will be described.

A controller 101 controls the units of the digital camera 100 in accordance with input signals or programs described below. Instead of the controller 101 controlling the entire apparatus, multiple pieces of hardware may share processes so as to control the entire apparatus.

An image pickup unit 102 performs an image pickup process. The image pickup process is a process in which object light with which an image is formed by a lens included in the image pickup unit 102 is converted into an electric signal which is subjected to, for example, a noise reduction process so that digital data is output as image data. After being stored in a buffer memory, the picked-up image data is subjected to predetermined computation by the controller 101, and is recorded on a recording medium 110. The digital camera 100 according to the present embodiment is provided with the following modes: a single shooting mode in which the image pickup process is performed only once upon reception of a shooting instruction, and a continuous shooting mode in which the image pickup process is performed repeatedly and continuously upon reception of a shooting instruction. In the continuous shooting mode, while a SW2 in a release switch included in an operation unit 105 described below is ON, the image pickup process is repeatedly and continuously performed at certain intervals. Before reception of a shooting instruction, a user may set in advance which mode is to be used to perform the image pickup process.

A nonvolatile memory 103 is an electrically removable and recordable nonvolatile memory, and stores, for example, programs described below which are executed by the controller 101.

A work memory 104 is used as, for example, a buffer memory which temporarily stores image data picked up by the image pickup unit 102, a memory for a display unit 106 which is used for displaying an image, and a work area for the controller 101.

The operation unit 105 is used to receive, from a user, an instruction which is given to the digital camera 100 by the user. The operation unit 105 includes operation components, such as a power button with which a user instructs that the power of the digital camera 100 be turned ON/OFF, a release switch with which a user instructs that the image pickup process be performed, and a playback button with which a user instructs that image data be played back. The release switch has a SW1 and the SW2. When the release switch enters a so-called half press state, the SW1 is turned ON. In this state, an instruction to perform a shooting preparation operation, such as an AF (autofocus) process, an AE (autoexposure) process, an AWB (auto white balance) process, or an EF (pre-flash) process, is received. When the release switch enters a so-called full press state, the SW2 is turned ON. In this state, an instruction to perform the image pickup process is received.

The display unit 106 displays, for example, a viewfinder image in a shooting operation, picked-up image data, and characters for an interactive operation. The display unit 106 is not necessarily provided for the digital camera 100. At least the digital camera 100 may be connected to the display unit 106 and have a display control function for controlling the display of the display unit 106.

On the recording medium 110, image data which is output from the image pickup unit 102, and position information and direction information which are obtained via a connection unit 111 described below can be recorded. The recording medium 110 may be removable from the digital camera 100, or may be integrated in the digital camera 100. That is, the digital camera 100 may have at least means for accessing the recording medium 110.

The connection unit 111 is one for communicating with an external apparatus. The digital camera 100 can receive/transmit data from/to an external apparatus via the connection unit 111. In the present embodiment, the connection unit 111 is an accessory shoe provided for the digital camera 100. The digital camera 100 can be connected with a connection unit 127 of the GPS accessory 120 described below, via the accessory shoe. The controller 101 communicates with the GPS accessory 120 via the accessory shoe. For example, the digital camera 100 can transmit a request for position information and direction information to the GPS accessory 120, and can receive position information and direction information which are transmitted from the GPS accessory 120. In the present embodiment, description is made in which the connection unit 111 serves as an accessory shoe, and in which the digital camera 100 and the GPS accessory 120 receive/transmit data through communication via the accessory shoe. However, the communication between the digital camera 100 and the GPS accessory 120 is not limited to this. For example, the digital camera 100 and the GPS accessory 120 may communicate with each other via a USB cable or through wireless communication.

The digital camera 100 is described above.

The GPS accessory 120 will be described below.

A controller 121 controls the units in the GPS accessory 120 in accordance with input signals and programs described below. Instead of the controller 121 controlling the entire apparatus, multiple pieces of hardware may share processes so as to control the entire apparatus.

An operation unit 122 is used to receive instructions about operations and settings of the GPS accessory 120, from a user. The operation unit 122 includes, for example, a power supply switch for switching between ON and OFF for the power supply of the GPS accessory 120.

A nonvolatile memory 123 stores programs (firmware) for controlling the units of the GPS accessory 120, and various kinds of setting information. The nonvolatile memory 123 also stores programs with which the controller 121 controls processes illustrated in flowcharts described below.

A work memory 124 is a memory for developing and executing the programs stored in the nonvolatile memory 123. The work memory 124 is used as a work area for the controller 121.

A direction acquisition unit 125 detects the direction of the GPS accessory 120, and outputs the direction information. This process is an exemplary direction acquisition process. The direction acquisition unit 125 includes, for example, an electronic compass. An electronic compass is also called a magnetic field sensor, a direction sensor, or the like, and devices which can detect earth magnetism are collectively called an electronic compass. An electronic compass can detect the earth magnetism two-dimensionally or three-dimensionally, and detect the direction of the electronic compass device itself with respect to the earth magnetism. The direction information is regularly obtained and recorded in the work memory 124. When direction information is already recorded in the work memory 124, it is overwritten with newly obtained direction information. Such a process causes the work memory 124 to store the latest direction information constantly. The direction acquisition unit 125 includes an acceleration sensor. The direction acquisition unit 125 may include a motion detection sensor, such as a gyro sensor, or a combination of an electronic compass and a motion detection sensor. Direction information acquired by the direction acquisition unit 125 can be transmitted to the digital camera 100 in accordance with the control by the controller 121.

A position acquisition unit 126 performs a positioning process. The positioning process is a process in which a signal is received from a GPS satellite and in which position information indicating a position of the GPS accessory 120 is obtained from the received signal. The position information acquired by the position acquisition unit 126 can be transmitted to the digital camera 100 in accordance with the control by the controller 121. The transmitted position information is associated with image data picked up by the digital camera 100, as a shooting position. In the present embodiment, the position information is represented by coordinates of the latitude and longitude. The position information is regularly obtained, and is recorded in the work memory 124. When position information is already recorded in the work memory 124, it is overwritten by newly obtained position information. Such a process causes the work memory 124 to store the latest position information constantly. The position acquisition unit 126 may include, for example, a combination of an acceleration sensor and the GPS, or an apparatus for obtaining position information from an external apparatus or the like, such as a base station for a cellular phone.

The connection unit 127 is a connection unit which can be connected with the connection unit 111 provided for the digital camera 100. The GPS accessory 120 can communicate with the digital camera 100 by connecting the connection unit 127 with the connection unit 111.

The GPS accessory 120 is described above.

Figure 2:
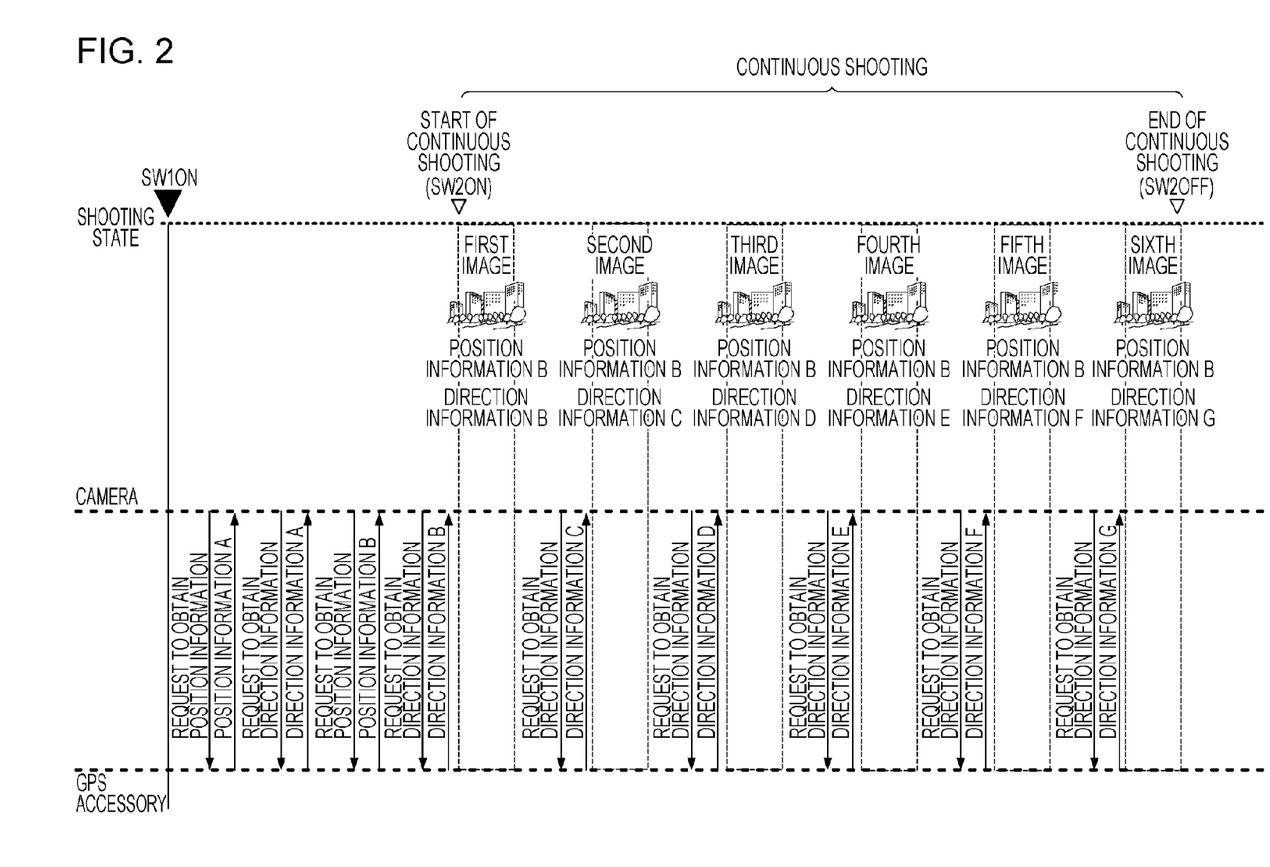
FIG. 2 is a conceptual diagram illustrating system operations in continuous shooting according to the first embodiment.

An overview will be described for a process of adding position information and direction information to an image in the above-described system while a continuous shooting operation is performed. FIG. 2 illustrates an example of how to obtain information when the digital camera 100 which communicates with the GPS accessory 120 via the accessory shoe is to add position information and direction information to images obtained through a continuous shooting operation.

FIG. 2 illustrates an example in which six images are picked up in the continuous shooting operation. In this example, the state of the continuous shooting operation in the digital camera 100, information obtained from the GPS accessory 120 at each shooting, and its timing are illustrated. The time axis runs from left to right.

After the SW1 is turned ON, the digital camera 100 regularly obtains position information and direction information until the SW2 is turned ON. Specifically, the digital camera 100 regularly transmits a request to obtain position information and a request to obtain direction information to the GPS accessory 120. The GPS accessory 120 which receives these requests transmits the latest position information and the latest direction information which are stored in the work memory 124 to the digital camera 100 as a response. The position information or the direction information which is received from the GPS accessory 120 is stored in the work memory 104 of the digital camera 100. When position information or direction information is already stored in the work memory 104, it is overwritten with the newly obtained information. Thus, in a time period after the SW1 is turned ON and before the SW2 is turned ON, the latest position information and the latest direction information are constantly stored in the work memory 104.

When the SW2 is turned ON, the continuous shooting operation starts. As described above, the image pickup processes in the continuous shooting operation according to the present embodiment are performed at certain intervals. During the continuous shooting operation according to the present embodiment, position information and direction information are not regularly obtained. Instead, the digital camera 100 according to the present embodiment obtains direction information from the GPS accessory 120 in a time period between the image pickup processes.

Referring to FIG. 2, the addition of direction information will be described. In the example in FIG. 2, direction information B obtained just before the continuous shooting operation starts is added to the first image obtained through the first image pickup process. In a time period after the first image is output and before the second image pickup process starts, the digital camera 100 transmits a request to obtain direction information to the GPS accessory 120, and the GPS accessory 120 transmits the latest direction information to the digital camera 100 as a response. Direction information C thus obtained is to be added to the second image which is to be obtained next. In the continuous shooting operation according to the present embodiment, the above-described procedure for the second image pickup process is repeated in the second and subsequent image pickup processes until the SW2 is turned OFF. In the example in FIG. 2, after the sixth image is picked up, the SW2 is turned OFF, and the continuous shooting operation is determined to be completed. The pieces of direction information B to G, each of which is obtained just before a corresponding image pickup process, are added to respective images obtained in the continuous shooting operation.

The addition of position information will be described. Position information is not obtained from the GPS accessory 120 during the continuous shooting operation, and the position information obtained just before the continuous shooting operation starts is used. That is, the digital camera 100 according to the present embodiment adds position information B obtained just before the SW2 is turned ON, as common information to each of the images obtained in the continuous shooting operation.

The process is described which is performed in the case where the digital camera 100 according to the present embodiment communicates with the GPS accessory 120 via the accessory shoe in the continuous shooting operation. Generally, since continuous shooting is performed in a short time period in the continuous shooting operation, the load on the controller 101 is heavy. Therefore, the load on the controller 101 is desirably to be lightened as much as possible by skipping acquisition of information which can be skipped in the continuous shooting operation.

Therefore, in the continuous shooting operation according to the present embodiment, direction information among direction information and position information is obtained as described above, while position information is not obtained. Specifically, according to the present embodiment, the digital camera 100 obtains direction information among direction information and position information, and does not obtain position information, in the continuous shooting operation.

In general, even in a short time period as in the continuous shooting operation, a change in direction information is likely to be relatively large, for example, when images of a moving object are picked up. Thus, even in a short time period as in the continuous shooting operation, it is desirable to obtain direction information for each of the frames in the continuous shooting operation. Accordingly, in the present embodiment, direction information is obtained for each of the image pickup processes in the continuous shooting operation, from the GPS accessory 120.

In contrast, in a short time period as in the continuous shooting operation, a change in the position information is relatively small. This is because a user is unlikely to move a large distance while pressing the release switch, and the latitude, the longitude, and the like are likely not to change markedly. That is, in a short time period as in the continuous shooting operation, even when the shooting positions for the images obtained through the image pickup processes are regarded as the same, a problem to occur is likely to be minor. Therefore, the position information is not obtained for each of the image pickup processes in the continuous shooting operation, from the GPS accessory 120. The position information obtained just before the continuous shooting operation according to the present embodiment starts is added to each of the images obtained in the continuous shooting operation, as common position information.

Thus, when the digital camera 100 according to the present embodiment communicates with the GPS accessory 120 via the accessory shoe, the digital camera 100 obtains direction information among position information and direction information in each of the shooting operations, and does not obtain position information, in the continuous shooting operation. This achieves compatibility between a reduction in the load on the controller during the continuous shooting operation and adequate control of acquisition of information that is to be added to the images obtained in the continuous shooting operation.

Figure 3:
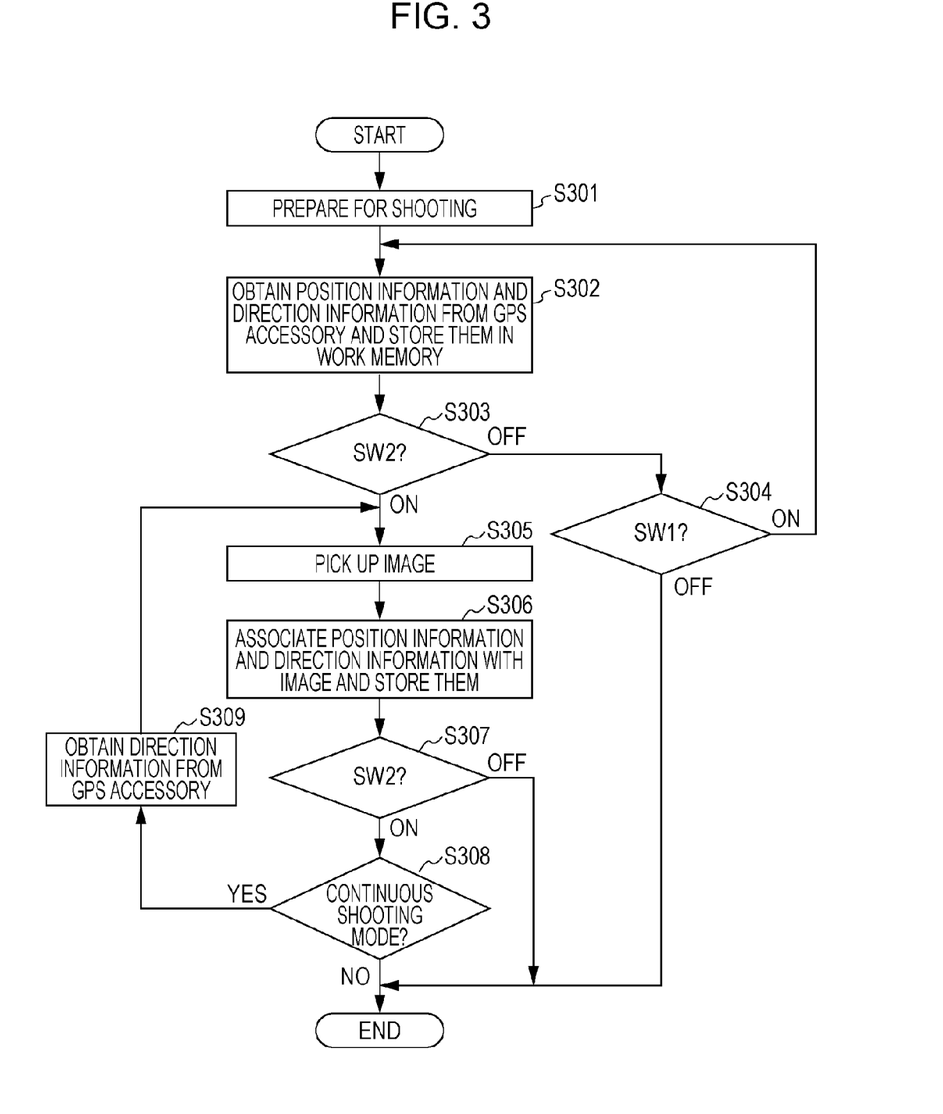
FIG. 3 is a flowchart describing operations of a digital camera in shooting according to the first embodiment.

Operations of the digital camera 100 in shooting will be described. FIG. 3 is a flowchart describing the operations of the digital camera 100 in shooting. The processes illustrated in the flowchart are performed in such a manner that the controller 101 of the digital camera 100 connected with the GPS accessory 120 executes programs recorded in the nonvolatile memory 103 and controls the units of the digital camera 100 according to the programs. In addition, the procedure illustrated in the flowchart is started in response to detection of the SW1 being turned ON. The subsequent flowcharts are similar to this flowchart in terms of the above-described description.

First, the controller 101 performs a shooting preparation operation in step S301. Specifically, the controller 101 performs operations, such as an AF (autofocus) process, an AE (autoexposure) process, an AWB (auto white balance) process, and an EF (pre-flash) process. The process in this step is performed in parallel with the processes in steps S302 to S304 as described below.

In step S302, the controller 101 obtains position information and direction information from the GPS accessory 120. Specifically, the digital camera 100 regularly transmits a request to obtain position information and a request to obtain direction information, to the GPS accessory 120. The GPS accessory 120 which receives these requests transmits the latest position information and the latest direction information which are stored in the work memory 124, as a response to the digital camera 100. The position information and the direction information received from the GPS accessory 120 are temporarily stored in the work memory 104. If position information and direction information are already stored in the work memory 104, they are overwritten with the position information and the direction information which are newly obtained, respectively.

In step S303, the controller 101 determines whether the SW2 is ON or OFF. If the controller 101 determines that the SW2 is OFF, the process proceeds to step S304.

In step S304, the controller 101 determines whether the SW1 is ON or OFF. If the controller 101 determines that the SW1 is OFF, the process is ended. If the controller 101 determines that the SW1 is ON, the process returns back to step S302, and the controller 101 obtains position information and direction information again. The position information and the direction information which are again obtained are stored in the work memory 104. If position information and direction information are already stored in the work memory 104, they are overwritten with the position information and the direction information which are newly obtained, respectively. That is, while the SW1 is ON and the SW2 is OFF, position information and direction information are repeatedly obtained, and the latest position information and the latest direction information are constantly stored. In other words, while a user half-presses the release switch, position information and direction information are repeatedly obtained, and the latest position information and the latest direction information are constantly stored.

In step S303, if the controller 101 determines that the SW2 is ON, the process proceeds to step S305. In step S305, the controller 101 performs an image pickup process by using the image pickup unit 102, and obtains an image.

In step S306, the controller 101 associates the position information and the direction information, which are stored in the work memory 104, with the image obtained in step S305, and records them on the recording medium 110. The position information and the direction information which are associated with the image obtained through the first image pickup process among the image pickup processes in the continuous shooting operation are those which are obtained in step S302. This process corresponds to a process of adding the position information B and the direction information B to the first image in the example of FIG. 2.

In step S307, the controller 101 determines whether the SW2 is OFF or ON. If the controller 101 determines that the SW2 is OFF, the shooting is determined to be completed, and the process is ended. If the controller 101 determines that the SW2 is ON, the process proceeds to step S308.

In step S308, the controller 101 determines whether the mode is the continuous shooting mode or the single shooting mode. If the controller 101 determines that the mode is not the continuous shooting mode, the process is ended. If the controller 101 determines that the mode is the continuous shooting mode, the process proceeds to step S309.

In step S309, the controller 101 obtains direction information from the GPS accessory 120 and does not obtain position information. Specifically, the digital camera 100 transmits a request to obtain direction information. The GPS accessory 120 which receives the request for direction information transmits the latest direction information stored in the work memory 124, as a response to the digital camera 100. The direction information received from the GPS accessory 120 is temporarily stored in the work memory 104. If direction information is already stored in the work memory 104, it is overwritten with the newly obtained direction information. Since position information is not obtained from the GPS accessory 120, the position information obtained in step S302 is still stored in the work memory 104. The process in this step corresponds to a process of obtaining the direction information C in the time period between the shooting of the first image and the shooting of the second image in the example in FIG. 2.

After that, the process proceeds to step S305, and an image pickup process is performed for the second image. In step S306, the position information and the direction information which are stored in the work memory 104 are associated with the image obtained in the second execution of step S305, and are recorded on the recording medium 110. The position information and the direction information which are associated with the second image are the position information obtained in step S302 and the direction information obtained in step S309. The process in this step corresponds to a process of adding the position information B and the direction information C to the second image in the example of FIG. 2.

During the continuous shooting operation, the controller 101 repeatedly performs steps S305 to S309. That is, during the continuous shooting operation, the controller 101 does not perform step S302, and performs step S309 for each of the image pickup processes. That is, in the image pickup processes according to the present embodiment which are continuously performed, direction information is obtained for each of the image pickup processes, and position information is not obtained for each of the image pickup processes. Accordingly, the position information which is obtained just before the continuous shooting operation is still stored during the continuous shooting operation. Therefore, the position information obtained in step S302 is added to the images obtained in the image pickup processes in the continuous shooting operation, as common information. In contrast, direction information is newly obtained for each of the image pickup processes in the continuous shooting operation. Therefore, direction information obtained in step S309 in each cycle is added to a corresponding one of the images obtained in the second and subsequent image pickup processes among the images obtained in the image pickup processes in the continuous shooting operation.

Through communication via the accessory shoe, the GPS accessory 120 transmits position information and direction information to the digital camera 100 in response to a request from the digital camera 100. The GPS accessory 120 regularly detects position information and direction information regardless of the operation of the digital camera 100. This operation does not depend on whether the digital camera 100 operates in the continuous shooting mode or the single shooting mode. That is, even when the digital camera 100 operates in the continuous shooting mode, the operation of the GPS accessory 120 is similar to that in the single shooting mode.

In the present embodiment as described above, in a continuous shooting operation, position information among position information and direction information is not obtained, while direction information is obtained. This achieves compatibility between a reduction in the load on the controller during the continuous shooting operation and adequate control of acquisition of information that is to be added to images obtained in the continuous shooting operation.

Second Embodiment

According to the embodiment described above, position information obtained just before the continuous shooting operation is added to images obtained in the continuous shooting operation, as common information. In contrast, according to the present embodiment, information obtained just after the continuous shooting operation is also used to add more adequate position information to images obtained in the continuous shooting operation.

A large part of the present embodiment is common to the first embodiment. Accordingly, the common part is not described, and a part peculiar to the present embodiment will be mainly described.

Figure 4:
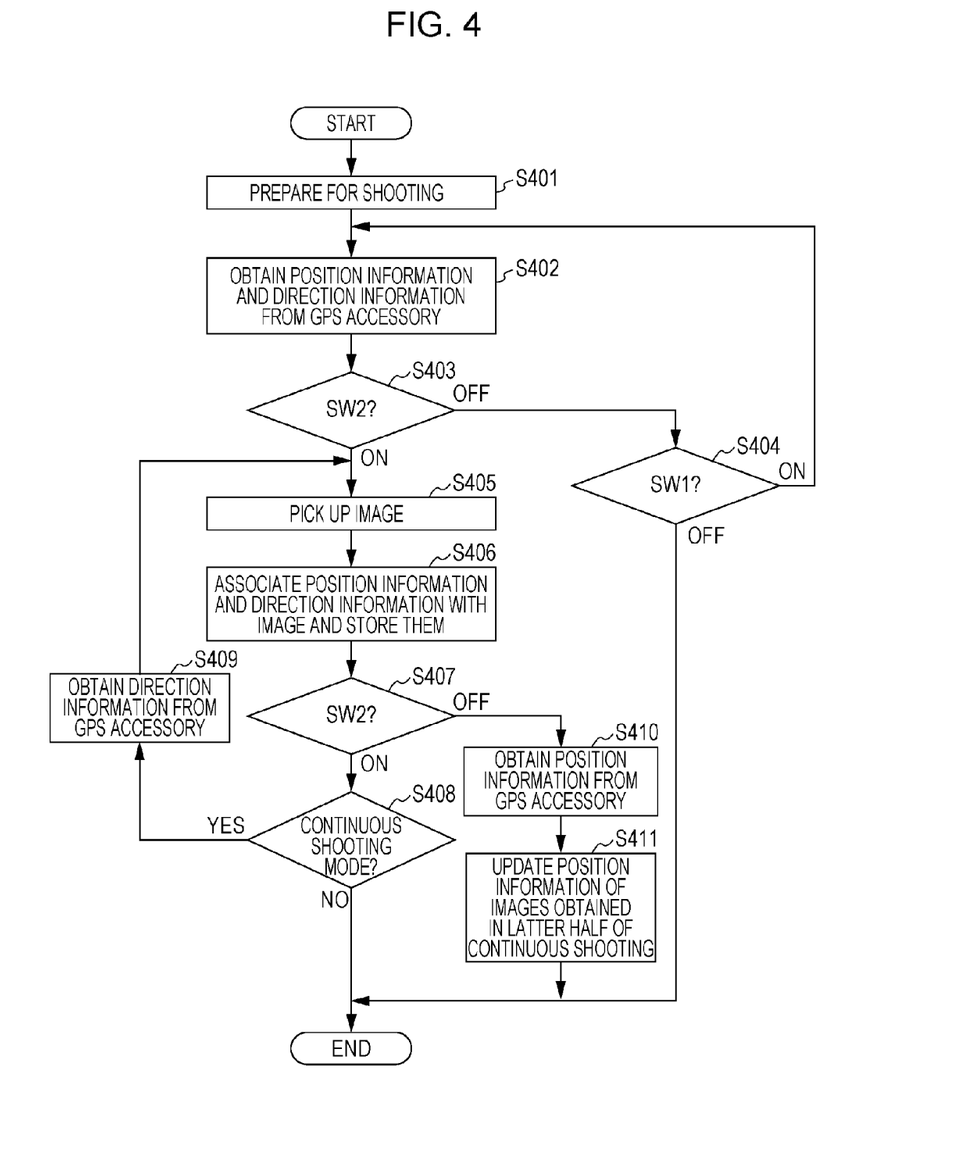
FIG. 4 is a flowchart describing operations of a digital camera in shooting according to a second embodiment.

FIG. 4 is a flowchart describing operations of the digital camera 100 in shooting according to the present embodiment.

In steps S401 to S406, the controller 101 performs operations similar to those in steps S301 to step S306 in FIG. 3.

In step S407, the controller 101 determines whether the SW2 is OFF or ON. If the controller 101 determines that the SW2 is ON, the process proceeds to step S408. In steps S408 and S409, the controller 101 performs processes similar to those in steps S308 and S309 in FIG. 3. In contrast, if the controller 101 determines that the SW2 is OFF, the continuous shooting operation is determined to be completed, and the process proceeds to step S410.

In step S410, similarly to step S402, position information is obtained from the GPS accessory 120. The process in this step is a process of obtaining position information just after the continuous shooting operation.

Figure 5:
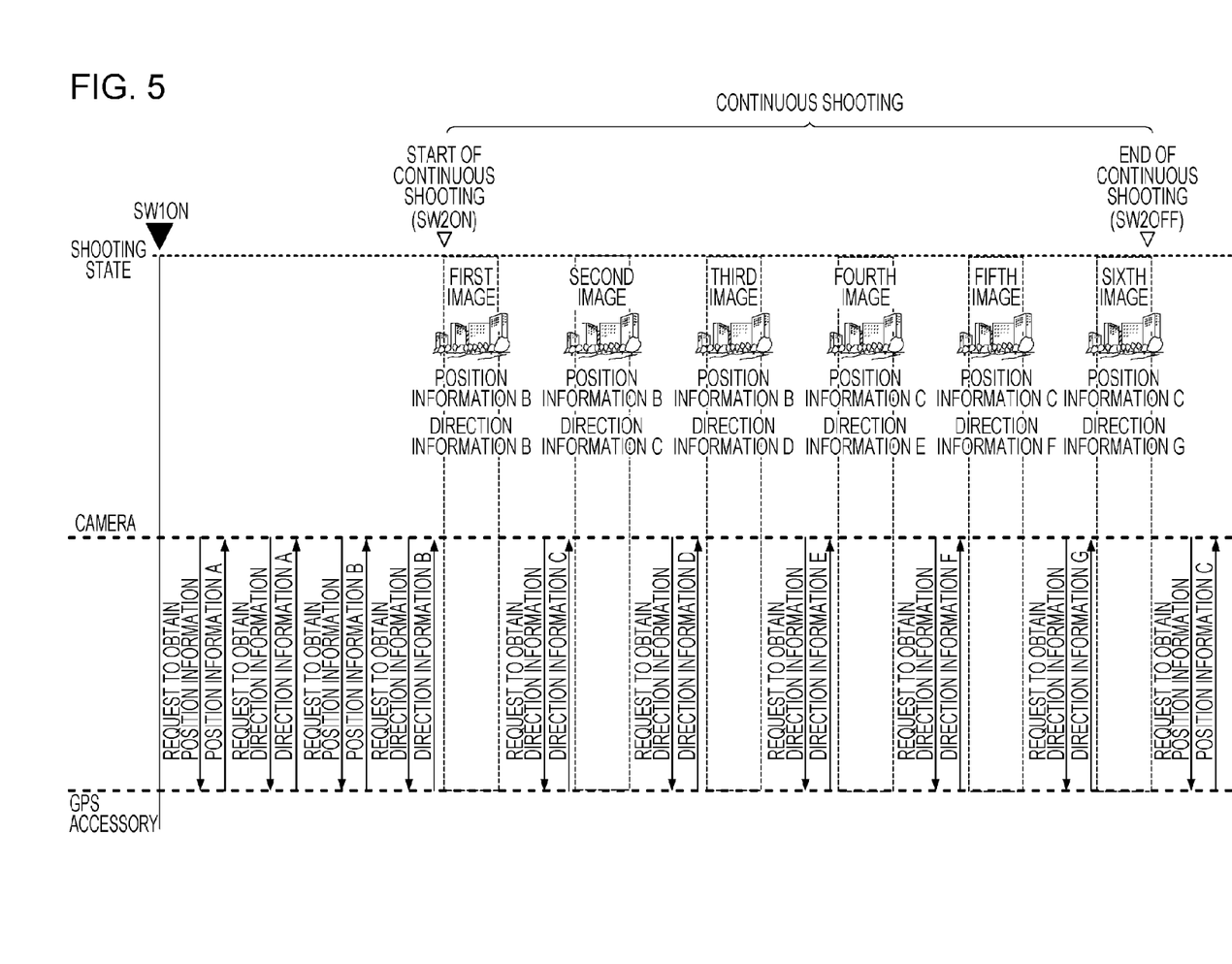
FIG. 5 is a conceptual diagram illustrating system operations in continuous shooting according to the second embodiment.

In step S411, the controller 101 associates the position information obtained in step S410 with the images obtained in the latter half of the continuous shooting operation among the images obtained in step S405. Specifically, the images obtained in the latter half of the continuous shooting operation are read out from the images stored in the recording medium 110 in step S406, and the position information which is obtained in step S402 and which is already associated with the read-out images is overwritten with the position information obtained in step S410. Then, the read-out images are stored in the recording medium 110 again. After that, the process is ended. Thus, the position information whose acquisition timing is likely to be closer to the acquisition timings of the images picked up in the latter half of the continuous shooting operation is added to the images. FIG. 5 illustrates an example describing this. FIG. 5 is a diagram illustrating an example of continuous shooting of six images in the continuous shooting operation as in FIG. 2. In the example in FIG. 5, in the final state, the position information B obtained just before the continuous shooting operation is added to the first to third images obtained in the first half of the continuous shooting operation, while position information C obtained just after the continuous shooting operation is added to the fourth to sixth images obtained in the latter half of the continuous shooting operation.

The operations of the digital camera 100 according to the present embodiment are described above. In general, in a short time period as in the continuous shooting operation, it is highly possible that a change in the position information is relatively small. Therefore, it is likely that adequate precision is achieved using pieces of position information obtained before and after the continuous shooting operation, without obtaining position information for each of the image pickup processes. Thus, the digital camera 100 according to the present embodiment has a configuration in which, as described above, the position information obtained just before the continuous shooting operation is added to the images obtained in the first half of the continuous shooting operation, and in which the position information obtained just after the continuous shooting operation is added to the images obtained in the latter half of the continuous shooting operation. This configuration enables more natural position information to be added to images even when the camera moves during the continuous shooting operation.

Other Embodiments

In the embodiments described above, the system is described in which the digital camera 100 and the GPS accessory 120 are connected with each other. The system may have a configuration in which the digital camera 100 includes the function of the GPS accessory 120 and in which only the digital camera 100 performs the above-described operations.

The embodiments described above have a configuration in which the direction information to be added to each of the images obtained in the image pickup processes in the continuous shooting operation is obtained before a corresponding one of the image pickup processes. A configuration may be employed in which the direction information to be added to the image obtained in each of the image pickup processes in the continuous shooting operation is obtained after the image pickup process. For example, using the example in FIG. 5, the direction information C may be added to the first image, and the direction information D may be added to the second image. Subsequently, similar to the above-described operation, direction information H may be obtained after the image pickup process for the sixth image, and may be added to the sixth image.

Figure 6:
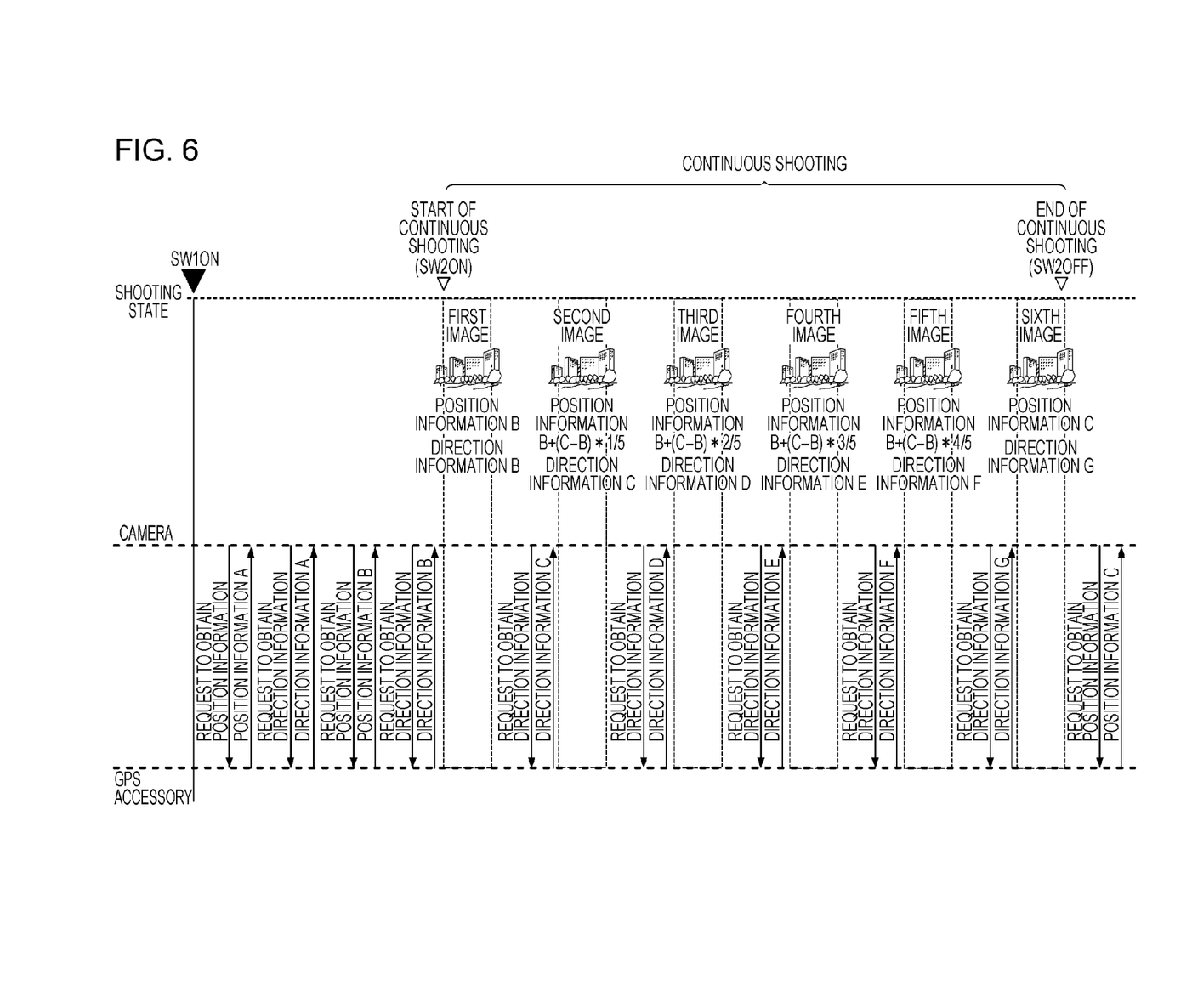
FIG. 6 is a conceptual diagram illustrating system operations in continuous shooting according to another embodiment.

In the embodiment described above, a configuration is described in which position information added to the images obtained in the continuous shooting operation is either the position information obtained before the continuous shooting operation starts or the position information obtained after the continuous shooting operation is completed. Information obtained from the position information obtained before the continuous shooting operation starts and the position information obtained after the continuous shooting operation is completed may be added to the images. For example, points may be obtained by dividing a straight line that connects a position indicated by the position information obtained before the continuous shooting operation starts with a position indicated by the position information obtained after the continuous shooting operation is completed, into equal parts, the number of which is equal to the number of images obtained in the continuous shooting operation. Each of these points may be added to a corresponding one of the images obtained in the continuous shooting operation. Specifically, position information for the nth image among the N images obtained in the continuous shooting operation is determined by using the expression $A+(B-A)*(n-1)/(N-1)$, where A represents position information obtained before the continuous shooting operation starts, and B represents position information obtained after the continuous shooting operation is completed. The determined position information is added to the nth image. The position information is represented by the latitude and longitude, and the latitude value or the longitude value is used in the above-described expression. For example, in step S411 in FIG. 4, instead of the position information obtained in step S410, the controller 101 adds pieces of position information obtained through the above-described calculation to the images obtained in the continuous shooting operation. FIG. 6 is a conceptual diagram for explaining this. In this example, pieces of position information obtained through the above-described calculation are added to the six respective images picked up in the continuous shooting operation. Thus, more natural position information can be added to the images even when the camera moves during the continuous shooting operation.

According to the embodiments described above, a configuration is described in which position information among position information and direction information is not obtained in the continuous shooting operation. A configuration may be employed in which position information is obtained every time a certain number of image pickup processes are performed, and in which the newly obtained position information is added to the images obtained in the subsequent image pickup processes. This configuration achieves compatibility between a reduction in the load on the controller during the continuous shooting operation and addition of more adequate position information to the images.

The above-described embodiments are also achieved by supplying software (programs) that achieves the function of the above-described embodiments to a system or an apparatus via a network or various recording media, and reading out and executing the programs by a computer (or a CPU, a MPU, or the like) in the system or the apparatus.

The present invention can achieve compatibility between a reduction in the load on a controller during a continuous shooting operation and adequate control of acquisition of information that is to be added to images obtained in the continuous shooting operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/078426, filed Dec. 8, 2011, which is hereby incorporated by reference herein in its entirety.

The invention claimed is:

1. An image pickup apparatus comprising:
continuous shooting means for performing a plurality of shooting operations and obtaining a plurality of images;
operation means for receiving an instruction from a user;
shooting preparation means for performing a shooting preparation operation for obtaining images by the continuous shooting means;
position acquisition means for acquiring position information;
direction acquisition means for acquiring direction information, and
association means for associating the direction information and the position information with the images,
wherein, in the plurality of shooting operations performed by the continuous shooting means, the position acquisition means does not acquire position information for each of the shooting operations performed by the continuous shooting means, and the direction acquisition means acquires direction information for each of the shooting operations performed by the continuous shooting means,
wherein the position acquisition means acquires position information in parallel with the shooting preparation operation.

2. The image pickup apparatus according to claim 1, wherein the association means associates direction information obtained just before each of the plurality of shooting operations with a corresponding one of the images obtained by the continuous shooting means.

3. The image pickup apparatus according to claim 1, wherein the direction acquisition means regularly acquires the direction information during a time period after the operation means receives an instruction to perform the shooting preparation operation and before the operation means receives an instruction to perform the shooting operations.

4. The image pickup apparatus according to claim 3, wherein the association means associates latest direction information with an image obtained in the first shooting operation among the images obtained in the shooting operations performed by the continuous shooting means, the latest direction information being among the pieces of direction information that are regularly acquired by the direction acquisition means.

5. The image pickup apparatus according to claim 1, wherein the association means associates direction information obtained just after each of the shooting operations performed by the continuous shooting means, with a corresponding one of the images obtained in the shooting operations performed by the continuous shooting means.

6. The image pickup apparatus according to claim 1, wherein, in a time period after the operation means receives an instruction to perform the shooting preparation operation and before the operation means receives an instruction to perform the shooting operations, the position acquisition means regularly acquires position information.

7. The image pickup apparatus according to claim 6, wherein the association means associates latest position information with the images obtained in the shooting operations performed by the continuous shooting means, as common position information, the latest position information being among the pieces of position information that are regularly acquired by the position acquisition means.

8. The image pickup apparatus according to claim 6, wherein the position acquisition means further acquires position information after all of the plurality of the shooting operations performed by the continuous shooting means are completed, and
wherein the association means associates position information with a corresponding one of the images obtained in the shooting operations, the position information being determined on the basis of at least latest position information among the pieces of position information that are regularly acquired by the position acquisition means and the position information that is further acquired after all of the shooting operations are completed.

9. The image pickup apparatus according to claim 1, wherein the position acquisition means further acquires position information after all of the shooting operations performed by the continuous shooting means are completed, and
wherein the association means associates the position information acquired after all of the shooting operations are completed or in parallel with the shooting preparation operation, with the images obtained in the shooting operations, as common position information.

10. The image pickup apparatus according to claim 1,
wherein the position acquisition means acquires the position information from an external apparatus, and
wherein the direction acquisition means acquires the direction information from an external apparatus.

11. The image pickup apparatus according to claim 1, further comprising:
communication means for communicating with an external apparatus,
wherein the external apparatus includes position detection means for detecting the position information, and direction detection means for detecting the direction information,
wherein the position acquisition means acquires the position information detected by the external apparatus, from the external apparatus, and
wherein the direction acquisition means acquires the direction information detected by the external apparatus, from the external apparatus.

12. The image pickup apparatus according to claim 11,
wherein the position detection means detects the position information at predetermined intervals regardless of whether or not the shooting operations are being performed by the continuous shooting means, and
wherein the direction detection means detects the direction information at predetermined intervals regardless of whether or not the shooting operations are being performed by the continuous shooting means.

13. The image pickup apparatus according to claim 1,
wherein the position acquisition means acquires the position information via an accessory shoe, and
wherein the direction acquisition means acquires the direction information via an accessory shoe.

14. The image pickup apparatus according to claim 1, further comprising:
position detection means for detecting the position information; and
direction detection means for detecting the direction information,
wherein the position acquisition means acquires the position information from the position detection means, and
wherein the direction acquisition means acquires the direction information from the direction detection means.

15. A method for controlling an image pickup apparatus, the method comprising the steps of:
performing a position acquisition process of acquiring position information;
performing a direction acquisition process of acquiring direction information;
performing a continuous shooting process of performing a plurality of shooting operations and of obtaining a plurality of image;
receiving an instruction from a user; and
performing a shooting preparation process of performing a shooting preparation operation for obtaining images by the continuous shooting means,
wherein, in the plurality of shooting operations performed during the shooting preparation process, position information is acquired in parallel with the shooting preparation operation, and
is not acquired for each of the shooting operations in the continuous shooting process, and
wherein, in the direction acquisition process performed during the continuous shooting process, direction information is acquired for each of the shooting operations in the continuous shooting process.

16. A non-transitory computer-readable storage medium storing a control program executing a method for controlling an image pickup apparatus, the method comprising the steps of:
performing a position acquisition process of acquiring position information;
performing a direction acquisition process of acquiring direction information; and
performing a continuous shooting process of performing a plurality of shooting operations and of obtaining a plurality of image;
receiving an instruction from a user; and
performing a shooting preparation process of performing a shooting preparation operation for obtaining images by the continuous shooting means,
wherein, in the plurality of shooting operations performed during the shooting preparation process, position information is acquired in parallel with the shooting preparation operation, and is not acquired for each of the shooting operations in the continuous shooting process, and
wherein, in the direction acquisition process performed during the continuous shooting process, direction information is acquired for each of the shooting operations in the continuous shooting process.

17. An image pickup apparatus comprising:
a shooting unit configured to perform a plurality of shooting operations and obtain a plurality of images;
an operation unit configured to receive an instruction from a user;
a memory for storing data and a computer program; and
a processor coupled to the memory for executing the computer program, the computer program comprising instructions for:
acquiring position information:
acquiring direction information;
associating the direction information and the position information with the images;
performing a shooting preparation operation for obtaining images by the shooting unit,
wherein, in the plurality of shooting operations performed by the shooting unit, the position acquisition unit does not acquire position information for each of the shooting operations performed by the continuous shooting unit, and the direction acquisition unit acquires direction information for each of the shooting operations performed by the continuous shooting unit,
wherein the position information is acquired in parallel with the shooting preparation operation.

18. The image pickup apparatus according to claim 17,
wherein the associating associates direction information obtained just before or just after each of the plurality of shooting operations with a corresponding one of the images obtained by the continuous shooting unit.

19. The image pickup apparatus according to claim 17,
wherein the acquiring acquires position information after all of the shooting operations are completed or before the shooting operations are started, and
wherein the associating associates the position information acquired after all of the shooting operations are completed or in parallel with the shooting preparation operation, as common position information.

20. The image pickup apparatus according to claim 17,
wherein the acquiring acquires the position information from an external apparatus, and
wherein the acquiring acquires the direction information from an external apparatus.

21. The image pickup apparatus according to claim 17, further comprising:
a position detection unit configured to detect the position information; and
a direction detection unit configured to detect the direction information,
wherein the acquiring acquires the position information from the position detection unit, and
wherein the acquiring acquires the direction information from the direction detection unit.

22. The image pickup apparatus according to claim 17, wherein the associating to associates the direction information and the position information with the image obtained in a continuous shooting operation without waiting for completion of the continuous shooting operation.

23. The image pickup apparatus according to claim 17, wherein the position information and the direction information are regularly acquired respectively, before a continuous shooting operation is started.

24. The image pickup apparatus according to claim 17, wherein, during a period other than a continuous shooting operation, the acquiring regularly acquires position information and direction information.

25. The image pickup apparatus according to claim 17, wherein the acquiring acquires the direction information during a time period after the operation unit receives an instruction to perform the shooting preparation operation and before the operation unit receives an instruction to perform the shooting operations.

26. The image pickup apparatus according to claim 17, wherein, in a time period after the operation unit receives an instruction to perform the shooting preparation operation and before the operation unit receives an instruction to perform the shooting operations, the acquiring acquires position information.

27. An image pickup apparatus comprising:
a shooting unit configured to obtain a plurality of images by performing a continuous shooting operation;
an operation unit configured to receive an instruction from a user;
a memory for storing data and a computer program; and
a processor coupled to the memory for executing the computer program, the computer program comprising instructions for:
acquiring position information;
acquiring direction information;
associating the direction information and the position information with the image; and
performing a shooting preparation operation for obtaining images by the shooting unit,
wherein the associating associates same position information with each of the images obtained in the continuous shooting operation, regardless of whether or not the image pickup apparatus is moving, and associates variable direction information with each of the images obtained in the continuous shooting operation,
wherein the position information is acquired in parallel with the shooting preparation operation.

28. The image pickup apparatus according to claim 27, wherein the associating associates direction information obtained just before or just after obtaining each of the images with a corresponding one of the images obtained in the continuous shooting operation performed by the shooting unit.

29. The image pickup apparatus according to claim 27, wherein the acquiring further acquires position information after the continuous shooting operation performed by the shooting unit is completed, and
wherein the associating associates the position information acquired after the continuous shooting operation is completed or in parallel with the shooting preparation operation with the images obtained in the continuous shooting operation, as common position information.

30. The image pickup apparatus according to claim 27, wherein the acquiring acquires the position information from an external apparatus, and
wherein the acquiring acquires the direction information from an external apparatus.

31. The image pickup apparatus according to claim 27, further comprising:
a position detection unit configured to detect the position information; and
a direction detection unit configured to detect the direction information,
wherein the acquiring acquires the position information from the position detection unit, and
wherein the acquiring acquires the direction information from the direction detection unit.

32. An image pickup apparatus comprising:
a shooting unit configured to obtain a plurality of images by performing a continuous shooting operation;
an operation unit configured to receive an instruction from a user;
a memory for storing data and a computer program; and
a processor coupled to the memory for executing the computer program, the computer program comprising instructions for:
acquiring position information;
acquiring direction information;
associating the direction information and the position information with the images; and
performing a shooting preparation operation for obtaining images by the shooting unit,
wherein the association unit associates same position information with two or more of the images obtained in the continuous shooting operation, regardless of whether or not the image pickup apparatus is moving, and associates individual direction information with the two or more of the images obtained in the continuous shooting operation,
wherein the position information is acquired in parallel with the shooting preparation operation.

33. An image pickup apparatus comprising:
a shooting unit configured to obtain a plurality of images by performing a continuous shooting operation;
an operation unit configured to receive an instruction from a user;
a memory for storing data and a computer program; and
a processor coupled to the memory for executing the computer program, the computer program comprising instructions for:
acquiring a position information;
acquiring direction information;
associating the direction information and the position information with the images; and
performing a shooting preparation operation for obtaining images by the shooting unit,
wherein the position information associated with each of the images obtained in the continuous shooting operation is the information obtained during a period other than the continuous shooting operation, and the direction information associated with each of the images obtained in the continuous shooting operation is the information obtained during the continuous shooting operation,
wherein the position information is acquired in parallel with the shooting preparation operation.

34. A method for controlling an image pickup apparatus, the method comprising the steps of:
obtaining a plurality of images by performing a continuous shooting operation;
receiving an instruction from a user;
performing a shooting preparation operation for obtaining images by the continuous shooting operation;
acquiring position information;
acquiring direction information; and
associating same position information with each of the images obtained in the continuous shooting operation, regardless of whether or not the image pickup apparatus is moving,
associating variable direction information with each of the images obtained in the continuous shooting operation,
wherein the position information is acquired in parallel with the shooting preparation operation.

35. A method for controlling an image pickup apparatus, the method comprising the steps of:
obtaining a plurality of images by performing a continuous shooting operation;
receiving an instruction from a user;
performing a shooting preparation operation for obtaining images by the continuous shooting operation;
acquiring position information;
acquiring direction information; and
associating same position information with two or more of the images obtained in the continuous shooting operation, regardless of whether or not the image pickup apparatus is moving,
associating individual direction information with the two or more of the images obtained in the continuous shooting operation,
wherein the position information is acquired in parallel with the shooting preparation operation.

36. A method for controlling an image pickup apparatus, the method comprising the steps of:
obtaining a plurality of images by performing a continuous shooting operation;
receiving an instruction from a user;
performing a shooting preparation operation for obtaining images by the continuous shooting operation;
acquiring position information;
acquiring direction information; and
associating the direction information and the position information with the images,
wherein the position information associated with each of the images obtained in the continuous shooting operation is the information obtained during a period other than the continuous shooting operation, and the direction information associated with each of the images obtained in the continuous shooting operation is the information obtained during the continuous shooting operation,
wherein the position information is acquired in parallel with the shooting preparation operation.

37. An image pickup apparatus comprising:
a shooting unit configured to perform a plurality of shooting operations and obtain a plurality of images;
an operation unit configured to receive an instruction from a user;
a memory for storing data and a computer program; and
a processor coupled to the memory for executing the computer program, the computer program comprising instructions for:
acquiring position information and direction information,
wherein, in the plurality of shooting operations performed by the shooting unit, the acquiring does not acquire position information for each of the shooting operations performed by the shooting unit, and the acquiring acquires direction information for each of the shooting operations performed by the shooting unit,
wherein the position information and the direction information are regularly acquired by the acquiring, respectively, before a continuous shooting operation is started,
wherein, during the continuous shooting operation, the acquiring acquires direction information for each of the shooting operations performed by the shooting unit while ignoring a regular interval.

38. An image pickup apparatus comprising:
a shooting unit configured to perform a plurality of shooting operations and obtain a plurality of images;
an operation unit configured to receive an instruction from a user;
a memory for storing data and a computer program; and
a processor coupled to the memory for executing the computer program, the computer program comprising instructions for:
updating position information and direction information,
wherein the position information and the direction information are regularly updated by the updating, respectively, before a continuous shooting operation is started,
wherein, during the continuous shooting operation, the updating updates direction information for each of the shooting operations performed by the shooting unit while ignoring a regular interval, and during the continuous shooting operation, the updating dose not update the position information.

39. An image pickup apparatus comprising:
a shooting unit configured to perform a plurality of shooting operations and obtain a plurality of images;
an operation unit configured to receive an instruction from a user;
a memory for storing data and a computer program; and
a processor coupled to the memory for executing the computer program, the computer program comprising instructions for:
acquiring position information and direction information;
associating the direction information and the position information with the images;
performing a shooting preparation operation for obtaining images by the shooting unit,
wherein, in the plurality of shooting operations performed by the shooting unit, the acquiring does not acquire position information for each of the shooting operations performed by the shooting unit, and the acquiring acquires direction information for each of the shooting operations performed by the shooting unit,
wherein the acquiring acquires the direction information during a time period after the operation unit receives an instruction to perform the shooting preparation operation and before the operation unit receives an instruction to perform the shooting operations.

40. An image pickup apparatus comprising:
a shooting unit configured to perform a plurality of shooting operations and obtain a plurality of images;
an operation unit configured to receive an instruction from a user;

a memory for storing data and a computer program; and a processor coupled to the memory for executing the computer program, the computer program comprising instructions for:

acquiring position information and direction information;

associating the direction information and the position information with the images;

performing a shooting preparation operation for obtaining images by the shooting unit, wherein, in the plurality of shooting operations performed by the shooting unit, the acquiring does not acquire position information for each of the shooting operations performed by the shooting unit, and the acquiring acquires direction information for each of the shooting operations performed by the shooting unit, wherein, the acquiring acquires position information during a time period after the operation unit receives an instruction to perform the shooting preparation operation and before the operation unit receives an instruction to perform the shooting operations.

* * * * *